(12) United States Patent
Hada et al.

(10) Patent No.: US 6,324,375 B1
(45) Date of Patent: Nov. 27, 2001

(54) IMAGE FORMING APPARATUS FOR ADJUSTING IMAGE FORMING CONDITION AND IMAGE FORMING CONDITION ADJUSTING METHOD

(75) Inventors: Yoshinobu Hada, Aichi-Ken; Masanori Murakami; Jinju Okuno, both of Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/260,592

(22) Filed: Mar. 2, 1999

(30) Foreign Application Priority Data

Mar. 3, 1998 (JP) .................................................. 10-050543

(51) Int. Cl.[7] .................................................. G03G 15/01
(52) U.S. Cl. .......................................... 399/301; 347/116
(58) Field of Search ............................. 399/64, 298, 299, 399/301, 302; 347/116

(56) References Cited

U.S. PATENT DOCUMENTS

| | | | |
|---|---|---|---|
| 5,266,976 | * | 11/1993 | Ohigashi et al. ..................... 347/116 |
| 5,452,073 | * | 9/1995 | Kataoka .................................. 399/299 |
| 5,550,625 | * | 8/1996 | Takamatsu et al. .................. 399/301 |
| 5,768,671 | * | 6/1998 | Komiya et al. ....................... 399/301 |
| 5,896,472 | * | 4/1999 | Takayama ......................... 347/116 X |

FOREIGN PATENT DOCUMENTS

| | | |
|---|---|---|
| 64-86175 | 3/1989 | (JP) . |
| 01-270073 | * 10/1989 | (JP) . |
| 08069146 | 3/1996 | (JP) . |

* cited by examiner

*Primary Examiner*—Sandra Brase
(74) *Attorney, Agent, or Firm*—McDermott, Will & Emery

(57) ABSTRACT

An image forming apparatus forms a color image by superimposing images formed in a plurality of colors. To prevent color deviations from occurring in the image forming apparatus, a predetermined registration pattern is formed in each of the plurality of colors, and an image forming position is adjusted for each color in accordance with a detection result given by a detecting unit on detecting the predetermined registration pattern. A value of a parameter having an effect on an output of the detecting unit is set for each color so that the value set for at least one of the colors is different to the values respectively set for other colors. The value of the predetermined parameter may be set as a fixed value for each color. Alternatively, the value of the predetermined parameter may be a variable that is automatically set.

18 Claims, 14 Drawing Sheets

Fig. 4

| SET PARAMETER | C、 M、 Y、 K |
|---|---|
| LED CURRENT | LED-I : 20mA、 20mA、 13mA、 25mA |
| DEVELOPING POTENTIAL DIFFERENCE | △V : 400v、 400v、 500v、 320v |
| GAIN CORRECTION COEFFICIENT (AMPLIFICATION FACTOR) | η : 1.0、 1.0、 1.3、 0.8 |

Fig. 5

| SET PARAMETER | C、 M、 Y、 K |
|---|---|
| LED CURRENT | LED-I : 25mA、 25mA、 25mA、 40mA |
| DEVELOPING POTENTIAL DIFFERENCE | △V : 300v、 300v、 300v、 500v |
| GAIN CORRECTION COEFFICIENT (AMPLIFICATION FACTOR) | η : 1.0、 1.0、 1.0、 1.8 |

Fig. 12A

| SET PARAMETER | C、 M、 Y、 K |
|---|---|
| LED CURRENT | LED-I : 20mA、 20mA、 20mA、 20mA |
| DEVELOPING POTENTIAL DIFFERENCE | △V : 400v、 400v、 400v、 400v |
| GAIN CORRECTION COEFFICIENT (AMPLIFICATION FACTOR) | η : 1.0、 1.0、 1.0、 1.0 |

Fig. 12B

| SET PARAMETER | C、 M、 Y、 K |
|---|---|
| LED CURRENT | LED-I : 20mA、 20mA、 15mA、 25mA |
| DEVELOPING POTENTIAL DIFFERENCE | △V : 400v、 400v、 530v、 320v |
| GAIN CORRECTION COEFFICIENT (AMPLIFICATION FACTOR) | η : 1.0、 1.0、 1.3、 0.8 |

IMAGE FORMING APPARATUS FOR ADJUSTING IMAGE FORMING CONDITION AND IMAGE FORMING CONDITION ADJUSTING METHOD

This application is based on application No. 10-50543 filed in Japan, the content of which is hereby incorporated by reference.

BACKGROUND OF THE INVENTION

(1) Field of the Invention

The present invention relates to an image forming apparatus, such as a copier and a laser printer, that forms a color image by superimposing images formed in different colors, and particularly relates to an improvement in a technique for adjusting a deviation of an image forming position for each color.

(2) Description of Related Art

In a conventional color image forming apparatus, data of an image to be reproduced is separated into four reproduction colors cyan, magenta, yellow, and black. Toner images corresponding to these reproduction colors are respectively formed and sequentially transferred onto a recording material such as a recording sheet. Here, the toner images are superimposed on the recording material to form a color image. When the toner images are deviated from the respective correct image forming positions, color deviations occur, thereby causing deterioration in the image quality. Hereinafter, the reproduction colors are respectively referred to as C, M, Y, and K, and components related to these colors are assigned numerals with a corresponding C, M, Y, or K.

A so-called "tandem-type" image forming apparatus, as one example of a conventional color image forming apparatus, has image forming units set in line corresponding to reproduction colors in a transporting direction of the recording material transported by a transfer belt. A timing at which a toner image is formed is different between the image forming units. Thus, the color deviations are likely to occur in the tandem-type image forming apparatus. It has been one of the greatest challenges to find a way to reduce the color deviations.

In general, registration adjustment is performed to adjust image forming positions in the tandem-type image forming apparatus, thereby preventing the color deviations from occurring. For the registration adjustment, toner patterns in a predetermined shape are formed on the transfer belt at predetermined positions, with the transfer belt being driven to move in the transporting direction of the recording material. The toner patterns are detected by an optical sensor set further downstream than the image forming units in the transporting direction of the recording material. The deviations of the toner patterns from the predetermined positions are obtained from the detection results given by the optical sensor. Then, the image forming positions are respectively adjusted in accordance with the detection results. Hereinafter, the toner patterns used for the registration adjustment are referred to as the "registration patterns". In general, a charge coupled device (referred to as the "CCD" hereinafter) or a photo diode (referred to as the "PD" hereinafter) is used for a photoreceptor of the optical sensor, and a light emitting diode (referred to as the "LED" hereinafter) is used for a light emitter of the optical sensor.

To properly maintain the quality of reproduced images by means of the registration adjustment, forming positions of the registration patterns should be detected with extreme precision from a few micrometers to less than twenty micrometers.

As a method for detecting the forming positions of the registration patterns formed on the transfer belt, a toner density on a surface of the transfer belt which is being rotated is sampled by the optical sensor that has the PD as the photoreceptor. When a line in a registration pattern passes by the optical sensor, a sampling waveform is obtained as shown in FIG. 1A. Here, a barycenter of this sampling waveform may be determined as the forming position of the line. In this method, clearances between sampling points are interpolated as shown in FIG. 1A to obtain the barycenter. Therefore, the number of sampling points can be reduced, and also, the forming position of the line in the registration pattern can be determined with high precision regardless of the sampling timing.

However, when values outputted by the optical sensor as the sampling points on detecting a registration pattern are small as shown in FIG. 1B, the sampling waveform cannot be clearly recognized. Also, adverse effects caused by noises and the like increase. To address this problem, methods for raising the output values have been suggested. For example, a background level of the transfer belt, on which the registration patterns are formed, can be made uniform. Or, the intensity of the laser beams can be maximized when the registration patterns are formed, so that part on the transfer belt where the registration patterns are formed is a vivid contrast to part where they are not formed.

Meanwhile, when the optical sensor having the LED as the light emitter is used, the reflectivity and transmittance are different among the toner colors C, M, Y, and K. For this reason, a detection level varies among the registration patterns formed in the corresponding toner colors. If the background level of the transfer belt is made uniform, or if the contrast on the transfer belt is enhanced, the detection level is raised for every color. Therefore, the variations in detection level cannot be eliminated.

As one example, suppose that the detection levels are greatly different among the four colors. When the output values of a color whose detection level is the lowest are increased to appropriate values by means of the uniformalization of the background level or the contrast enhancement, the output values of a color whose detection level is the highest are also increased. The increased values of the color with the highest detection level may reach the detection limit and may be outputted as constant values around the peak value (barycenter) as shown in FIG. 1C. In this case, the waveform cannot be correctly obtained. This leads to the deterioration of the detection precision. Similarly, when the output values with the highest detection level are reduced to appropriate values, the output values with the lowest detection level become too small. This also leads to the deterioration of the detection precision.

Meanwhile, a method to adjust the output values of the four colors has also been suggested. More specifically, a source of light is switched by the light emitter of the optical sensor for each of red (R), green (G), and blue (B). Then, the registration patterns for C, M, and Y are exposed using the corresponding complementary color lights. Using this method, however, the source of light is increased in size and exposure positions are set different among the colors. To detect the same point by each source of lights, the optical sensor needs to be increased in size and the high precision is required. This leads to a high cost. In addition, the values outputted by the optical sensor on detecting the registration pattern formed from black toner containing carbon cannot be raised using this method.

SUMMARY OF THE INVENTION

The object of the present invention is to improve a precision in detection of registration patterns formed in different colors, by reducing differences in detection output of the registration patterns to a preferable level using a simple construction without adding any physical elements such as a plurality of light sources.

The object of the present invention can be achieved by an image forming apparatus which forms a color image by superimposing images formed in a plurality of colors according to an image forming condition, the image forming apparatus made up of: a pattern former which forms a pattern in each of the plurality of colors on a transfer medium; a detector which detects the pattern formed in each color on the transfer medium and outputs a detection result for each color in accordance with a predetermined parameter; and an image forming condition controller which sets a value of the predetermined parameter for each color so as to control the image forming condition, the value set for at least one of the colors being different to the values set for other colors.

With this construction, a detection result value outputted by the detector is adjusted for at least one color, so that the precision in detection of the registration pattern formed in the color can be improved. It should be noted here that the scope of application of the present invention is not limited to a specific embodiment where an adjustment is made in the image forming position using the registration patterns. The present invention is capable of other embodiments where toner patterns are used, as long as a toner pattern is formed in each of a plurality of colors.

The object of the present invention can be also achieved by an image forming position adjusting method for an image forming apparatus which forms a color image by superimposing images formed in a plurality of colors, the image forming position adjusting method including: a pattern forming step of forming a pattern in each of the plurality of colors on a transfer medium; a position detecting step of detecting a position of the pattern and outputting a detection result; a parameter value setting step of setting a value of a parameter having an effect on the detection result outputted in the detecting step for each color, the value set for a color being different to the values set for other colors; and an adjusting step of adjusting an image forming position in accordance with the detection result, wherein the parameter value setting step is capable of being performed in advance of the position detecting step, and wherein the parameter value setting step is capable of being performed in advance of the pattern forming step.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows parameters having effects on values outputted from an optical sensor unit and also shows a setting example of parameters, with the optical sensor unit being transmission type;

FIG. 5 shows parameters having effects on values outputted from the optical sensor unit and also shows a setting example of parameters, with the optical sensor unit being reflection type;

FIG. 12A shows a setting example of parameters before the adjustment;

FIG. 12B shows a setting example of parameters after the adjustment;

DESCRIPTION OF PREFERRED EMBODIMENTS

The following is a description of embodiments of the present invention, with reference to the drawings. In these embodiments, a digital color copier (referred to as the "copier" hereinafter) is used as an example of image forming apparatuses that the present invention can be applied to.

First Embodiment (1) Construction of Copier

Figure 2:
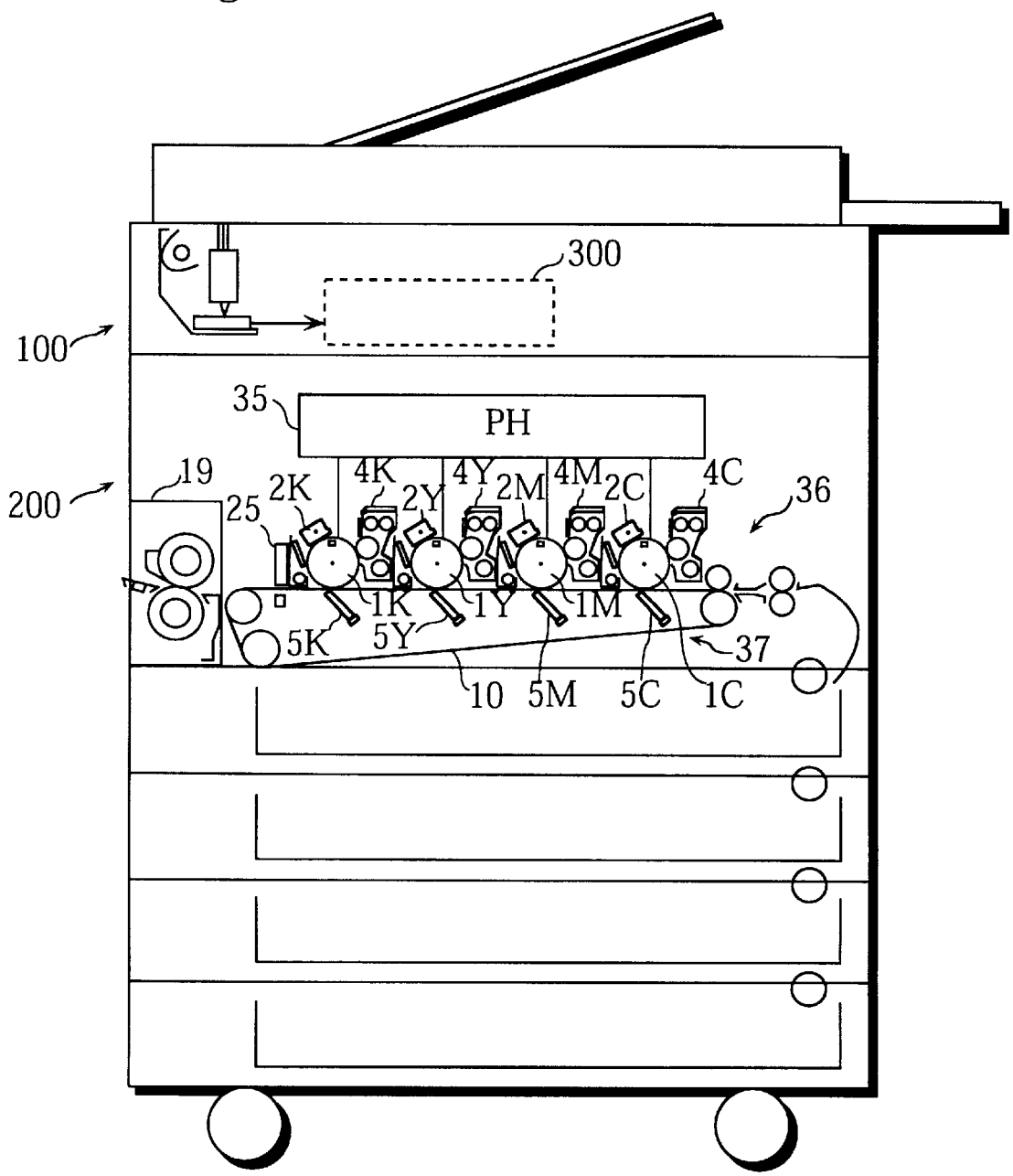
FIG. 2 is a schematic cross-sectional view showing a construction of a digital color copier of embodiments of the present invention.

FIG. 2 is a schematic cross-sectional view showing the construction of the copier of the present embodiment. This copier is a so-called tandem-type copier which forms a color image by superimposing images formed by a plurality of image forming units set along a transfer belt. Although the tandem-type copier is used as an example in the present embodiment, the present invention can be applied to various color image forming apparatuses, such as an analogue copier, printer, and facsimile, as long as they have a construction to detect a toner pattern for each color using an optical sensor.

The copier shown in FIG. 2 is mainly composed of an image reading unit 100 for reading a document image and a printing unit 200 for reproducing the document image read by the image reading unit 100. Each of components provided in these units is controlled by a control unit 300.

A CCD color image sensor provided in the image reading unit 100 reads the document image as multivalued electric signals for each of colors red (R), green (G), and blue (B). Each multivalued electric signal is converted into 8-bit gradation data for C, M, Y, or K. The well-known image processes, such as the color correction process, are also performed on the multivalued electric signals in the image reading unit 100.

The printing unit 200 is composed of a printer head unit 35 (simply referred to as the "PH 35" hereinafter), an image forming system 36, and a transporting system 37. With this construction, laser diodes (not shown) in the PH 35 emit laser beams corresponding to the gradation data in accordance with signals outputted from the image reading unit 100. These laser beams respectively expose photosensitive drums 1C to 1K which are being rotated.

The photosensitive drums 1C to 1K are uniformly charged by chargers 2C to 2K. By means of the exposure, electrostatic latent images are respectively formed on the surfaces of the photosensitive drums 1C to 1K. Developing units 4C to 4K respectively develop the electrostatic latent images formed on the corresponding photosensitive drums 1C to 1K using the corresponding C, M, Y, and K toners. The developed toner images are sequentially transferred onto a recording material (such as a recording sheet) transported by a transfer belt 10 by means of actions of electric fields applied by transfer brushes 5C to 5K. The recording material is separated from the transfer belt 10 after the image transfer, and a fixing unit 19 then fixes toner particles forming the image on the recording material. After this, the recording material is discharged onto a discharge tray. Note that the transfer belt 10 is made up of transparent material such as polyethylene terephthalate.

An optical sensor unit 25 is set further downstream than the image forming units on the transfer belt 10 in the transporting direction of the recording material. The registration adjustment is performed using detection values given by the optical sensor unit 25. A transmission type optical sensor is used for the optical sensor unit 25, and an LED emitting a red light is used as a light emitter of the optical sensor. Note that a color of the light emitted from the LED can be another color, such as green and yellow. In addition, a reflection type optical sensor can be used for the optical sensor unit 25 when the transfer belt 10 is made up of opaque material. A PD is used as a photoreceptor of the optical sensor. A voltage outputted by the PD is amplified by an amplifier and the amplified voltage value is outputted as a detection result of the optical sensor unit 25. Here, an amplification factor may be changed corresponding to a detected color in the present embodiment. The registration adjustment performed using the optical sensor unit 25 is described in detail later in this specification.

(2) Construction of Control Unit 300

Figure 3:
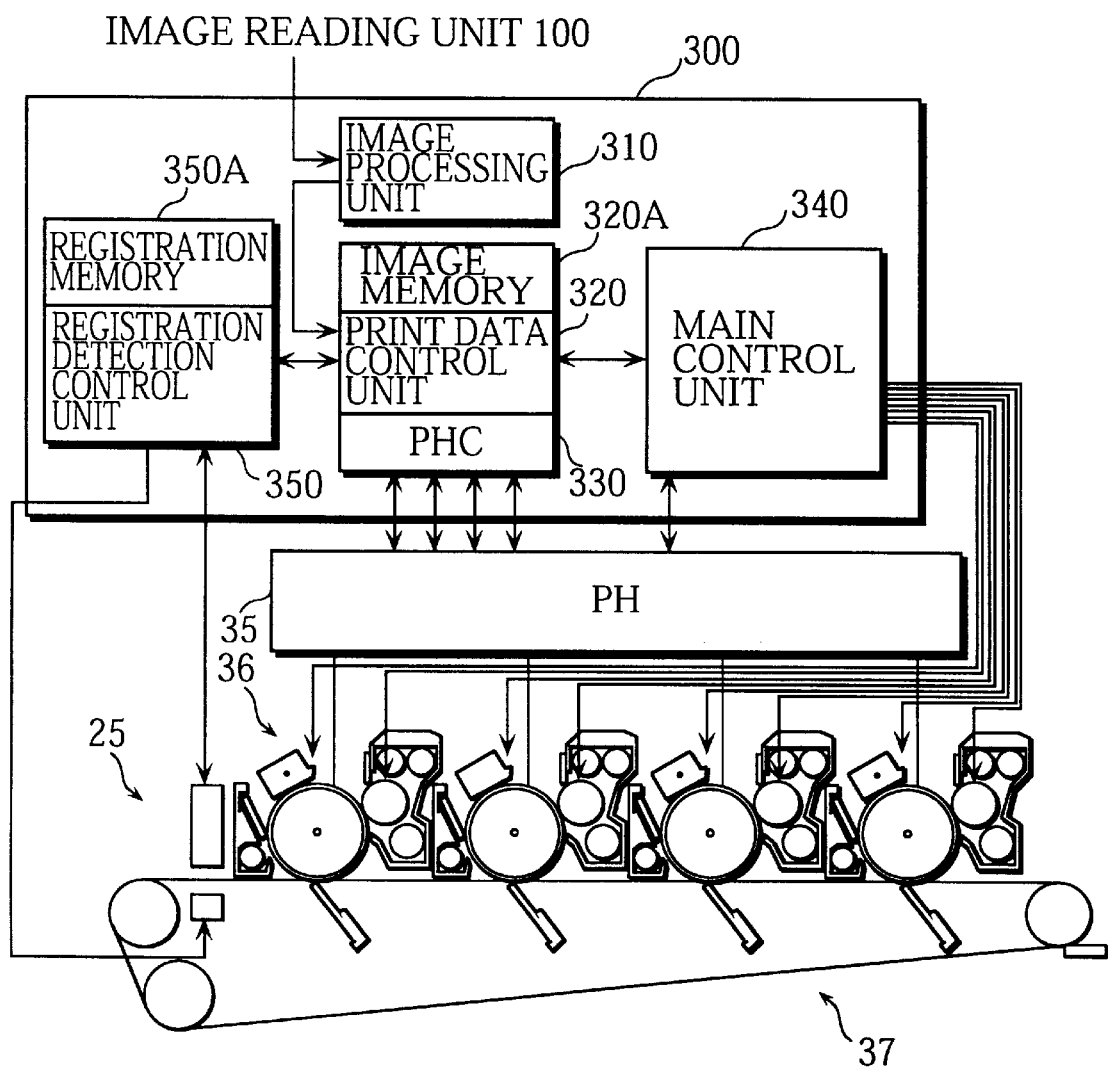
FIG. 3 is a functional block diagram of a control unit of the digital color copier of the embodiments of the present invention.

The control unit 300 is composed of a CPU for performing various operations, a RAM for serving as a work area of the CPU, a ROM for storing control programs, an A/D converter, and a D/A converter. FIG. 3 is a functional block diagram of the control unit 300.

The control unit 300 includes an image processing unit 310, a print data control unit 320, a printer head control unit 330 (simply referred to as the "PHC 330" hereinafter), and a main control unit 340. The image processing unit 310 performs various image processes, such as a process for converting the electric signals outputted from the image reading unit 100 into the gradation data for C, M, Y, and K. The print data control unit 320 stores print data outputted from the image processing unit 310 into an image memory 320A and controls the print data outputs. The PHC 330 controls the PH 35 in accordance with the print data. The main control unit 340 controls the image forming system 36 and the transporting system 37 in synchronization with a control timing of the PHC 330. The print data control unit 320, the PHC 330, and the PH 35 constitute an image writing means.

The control unit 300 further includes a registration detection control unit 350 for performing the registration adjustment. The registration detection control unit 350 instructs the print data control unit 320 to form registration patterns (including lines described later) on the transfer belt 10. Here, data for printing the registration pattern is stored in the image memory 320A beforehand. The registration patterns are formed on the transfer belt 10 and sequentially detected by the optical sensor unit 25 whenever a predetermined time period has elapsed. A forming position (may simply referred to as the "position" hereinafter) of a line in a registration pattern is obtained from the detection result given by the optical sensor unit 25. In accordance with the obtained position, the print data control unit 320 corrects an address for each pixel stored in the image memory 320A. This address correcting operation is described later in this specification.

A registration memory 350A is provided in the registration detection control unit 350. In the registration memory 350A, values assigned as parameters (the parameters are referred to as the "set parameters" hereinafter) having effects on values outputted from the optical sensor unit 25 are stored beforehand. Under these set values, the optical sensor unit 25 outputs values on detecting the registration patterns at a preferable level. FIG. 4 shows a setting example of the set parameters stored in the registration memory 350A. The set parameters include a current LED-I to be applied to the LED of the optical sensor unit 25, a developing potential difference $\Delta V$ of the photosensitive drums 1C to 1K, and an amplification factor $\eta$ used for outputs from the PD of the optical sensor unit 25.

Setting the current LED-I to be applied to the LED means setting the amount of light emitted from the LED of the optical sensor unit 25. The developing potential difference $\Delta V$ refers to the potential difference between a developing bias voltage (Vb) and a decay potential of the laser exposure. Therefore, the developing potential difference $\Delta V$ can be changed according to a grid voltage Vg to be applied to the corresponding charger 2C to 2K, a bias voltage Vb to be applied to the corresponding developing unit 4C to 4K, and a maximum exposure level of the corresponding laser beam emitted from the PH 35. Thus, setting the developing potential difference $\Delta V$ means setting the toner density of the corresponding registration pattern. As such, the grid voltage Vg, the bias voltage Vb, the maximum exposure level may be set as the set parameters. Also, a background level of the transfer belt 10 can be set as the set parameter.

The transmission type sensor is used for the optical sensor unit 25 in the present embodiment. As such, the background level is set at 0(V) while the PD is receiving the light from the LED, and is set at a maximum value while the PD is not currently receiving the light from the LED. Thus, the optical sensor unit 25 outputs a small value on detecting a registration pattern formed in a color whose amount of transmission is large, and outputs a great value on detecting a registration pattern formed in a color whose amount of transmission is small.

The red LED is used as the light emitter in the present embodiment. Therefore, the transmittance of yellow toner is the highest. As such, the current LED-I for the yellow registration pattern is set lowest so that the amount of light emitted from the LED is minimized as shown in FIG. 4. Also, the developing potential difference $\Delta V$ is set highest so that the toner density of the yellow registration pattern becomes the highest. As a result, the amount of transmitted light is minimized. Simultaneously, the amplification factor $\eta$ is set highest so that the output value of the amplifier is maximized. Consequently, the value outputted by the optical sensor unit 25 on detecting the yellow registration pattern is increased to an appropriate value equivalent to the values outputted by the optical sensor unit 25 on detecting the cyan and magenta registration patterns.

Meanwhile, the transmittance of black toner is the lowest. As such, the current LED-I for the black registration pattern is set highest so that the amount of light emitted from the LED is maximized as shown in FIG. 4. Also, the developing potential difference ΔV is set lowest so that the toner density of the black registration pattern becomes the lowest. As a result, the amount of transmitted light is maximized. Simultaneously, the amplification factor η is set lowest so that the output value of the amplifier is minimized. Consequently, the value outputted by the optical sensor unit 25 on detecting the black registration pattern is reduced to an appropriate value equivalent to the values outputted by the optical sensor unit 25 on detecting the cyan and magenta registration patterns.

Note that the setting shown in FIG. 4 is an example, and is changed according to various factors, such as the color of the light emitted from the LED. When the transfer belt 10 is made up of material whose color is opaque dark color like black and the reflection type sensor is used for the optical sensor unit 25, the setting can be made as shown in FIG. 5, for example. This setting is made in consideration of the low reflectivity of the black toner. More specifically, the current LED-I for the black registration pattern is set highest so that the amount of light emitted from the LED is maximized. Also, the developing potential difference ΔV is set highest so that the toner density of the black registration pattern becomes the highest. As a result, the amount of reflected light is maximized. Simultaneously, the amplification factor η is set highest so that the output value of the amplifier is maximized. Consequently, the value outputted by the optical sensor unit 25 on detecting the black registration pattern is increased to an appropriate value equivalent to the values outputted by the optical sensor unit 25 on detecting the cyan, magenta, and yellow registration patterns.

(3) Operation for Registration Adjustment Control

Figure 6:
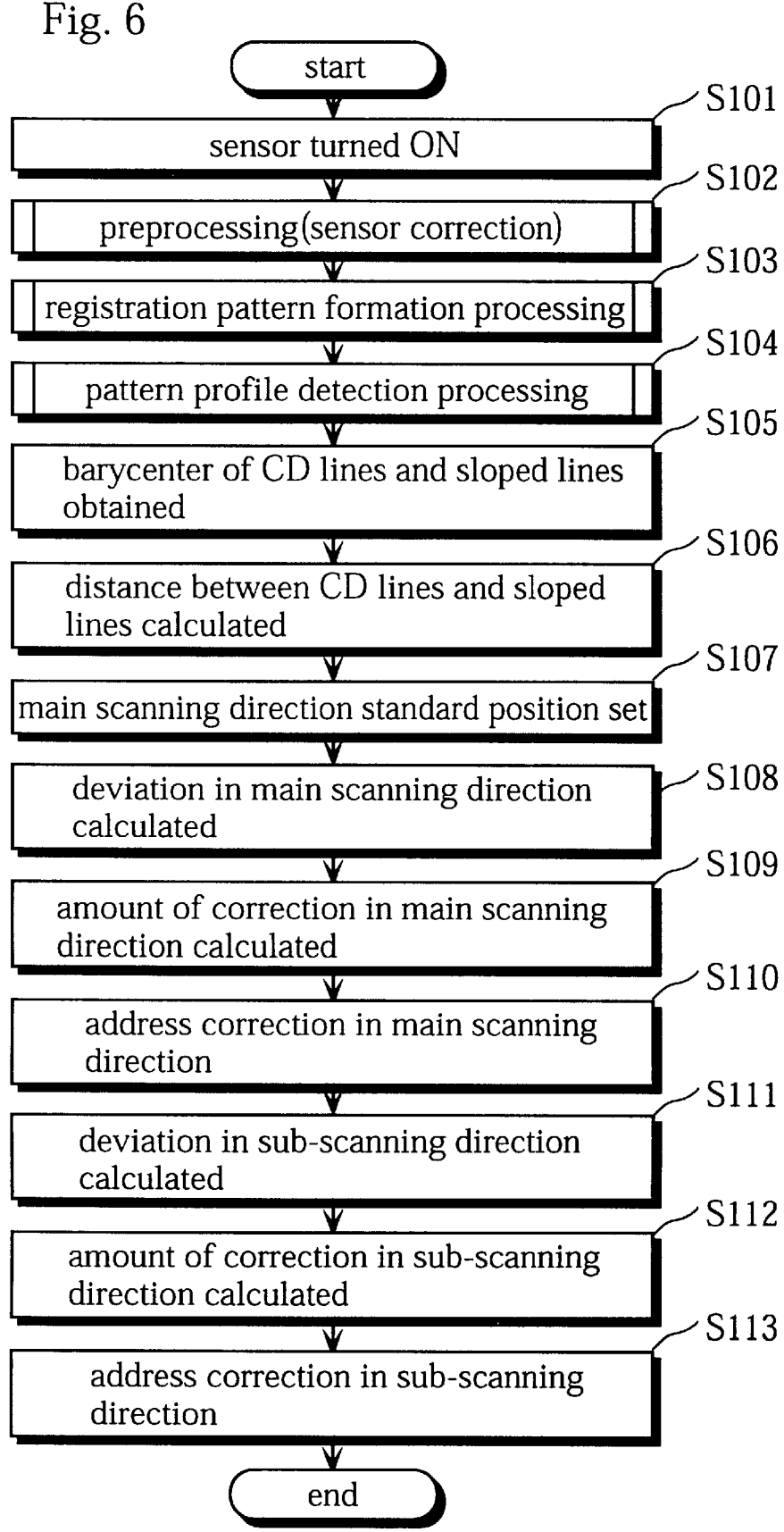
FIG. 6 is a flowchart of a control operation performed for registration adjustment.

The following is a description of a control operation performed for the registration adjustment of the copier having the stated construction. FIG. 6 is a flowchart of this control operation. The registration adjustment is performed at a predetermined timing, such as when the copier is turned on and whenever a predetermined time period has elapsed.

Figure 7:
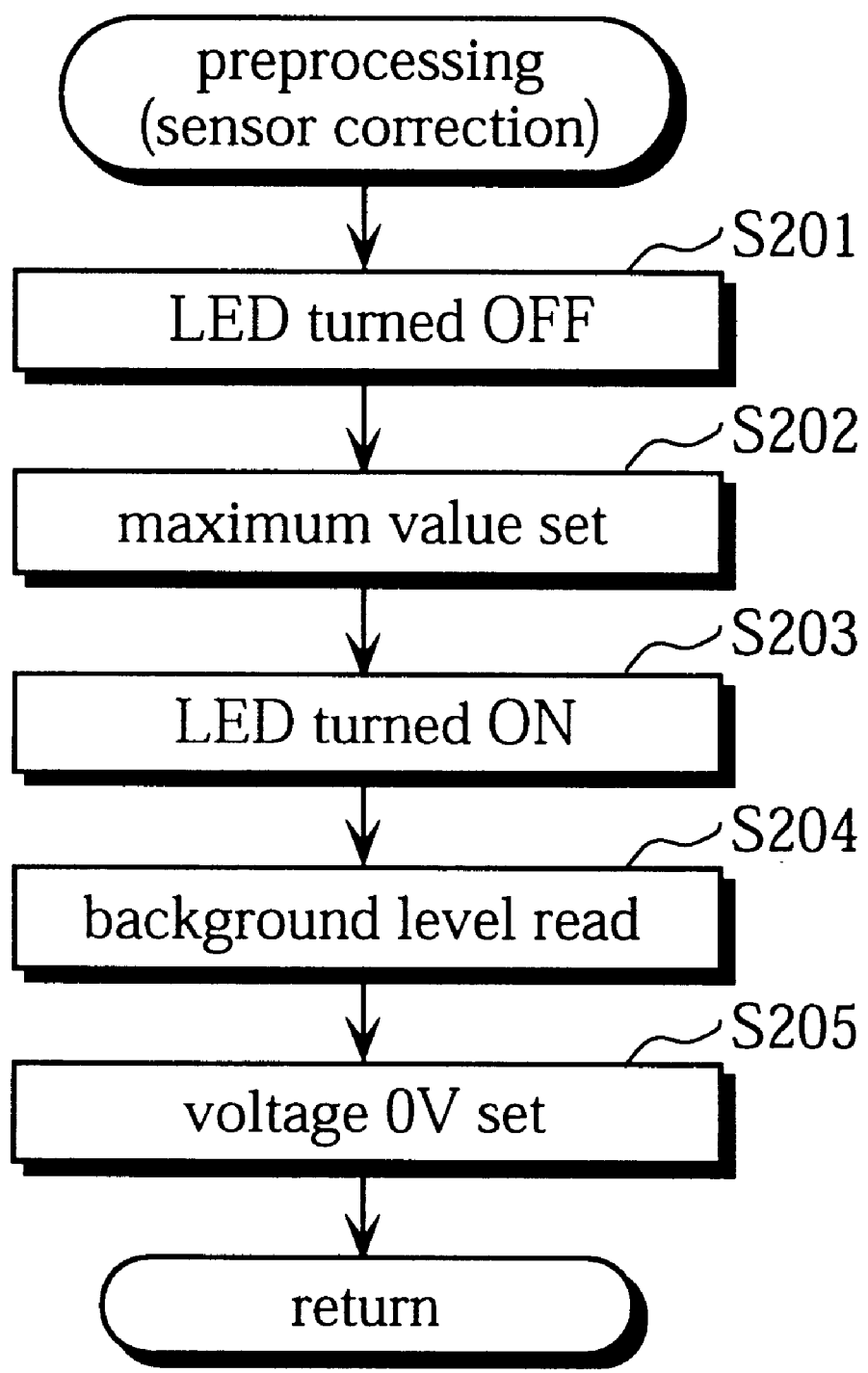
FIG. 7 is a flowchart of a control operation performed for preprocessing.

The optical sensor unit 25 is first turned on (step S101). Then, preprocessing for correcting the setting of the optical sensor unit 25 is performed (step S102). FIG. 7 is a flowchart of the operation performed for the preprocessing. The LED of the optical sensor unit 25 is turned off (step S201), and the value outputted from the PD at this moment is set as the maximum value (step S202). After this, the LED is turned on and emits the light (step S203). The amount of the light to be emitted from the LED is set in accordance with the values set for the cyan and magenta registration patterns as shown in FIG. 4. The light is emitted to the PD through the transparent transfer belt 10, and the value outputted from the PD receiving the light is read as the background level (step S204). The value set as the background level is then set as the voltage 0(V) (step S205).

Figure 8:
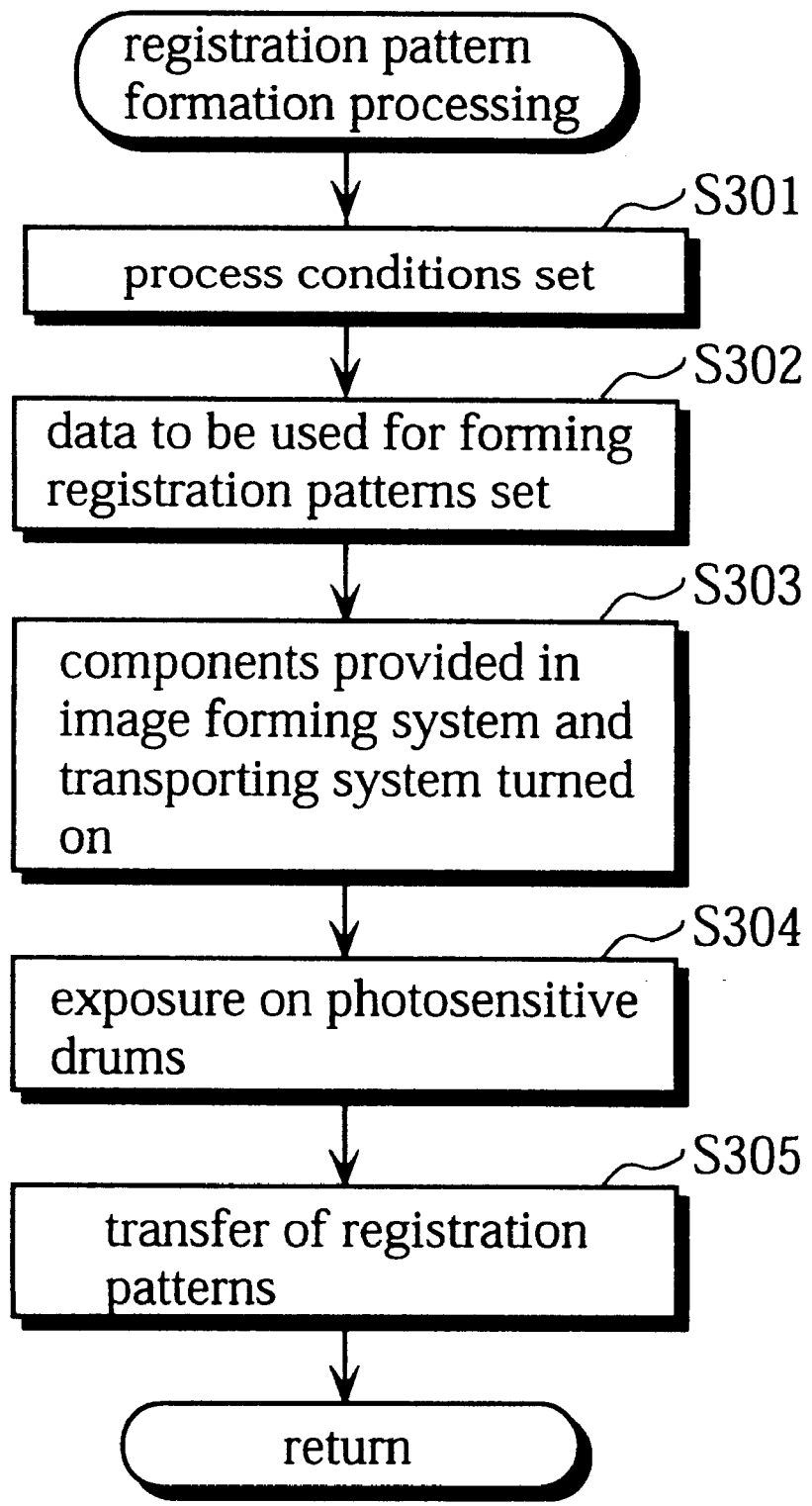
FIG. 8 is a flowchart of a control operation performed for registration pattern formation processing.

On completion of the preprocessing, registration pattern formation processing is next performed (step S103). FIG. 8 is a flowchart of the operation performed for the registration pattern formation processing. Process conditions, such as the grid voltage Vg, the bias voltage Vb, and the maximum exposure level are set in the main control unit 340 (step S301). Here, the grid voltage Vg, the bias voltage Vb, and the maximum exposure level are set for each color so that the respective developing potential difference ΔV shown in FIG. 4 are realized.

Figure 9A:
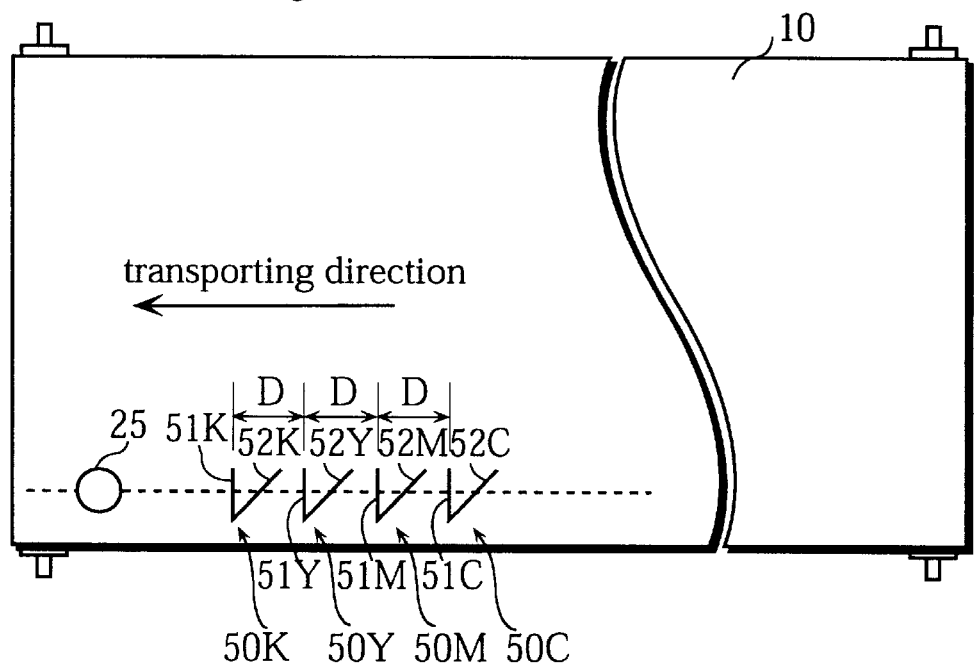
FIG. 9A shows an example of registration patterns.
Figure 9B:
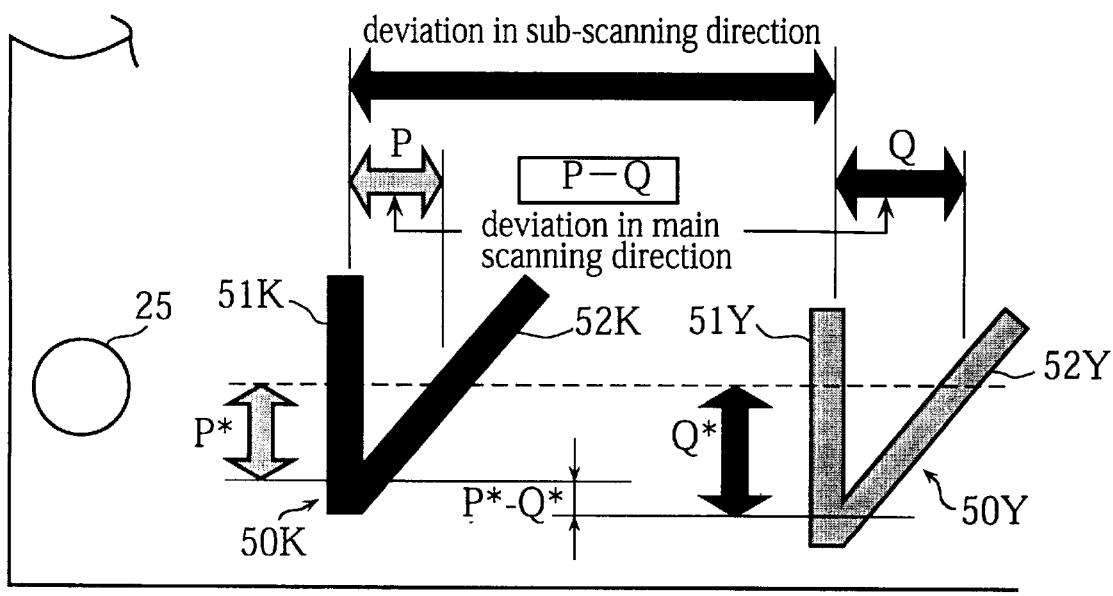
FIG. 9B shows a partial enlarged view of registration patterns.

The data for writing the registration pattern stored in the image memory 320A is set as image data to be used (step S302). FIGS. 9A and 9B show examples of the registration patterns formed on the transfer belt 10. Registration patterns 50C to 50K are formed in the same shape, and are V-shaped in FIGS. 9A and 9B. The V-shaped registration patterns 50C to 50K are respectively composed of CD lines 51C to 51K making right angles with the transporting direction of the recording material when no deviation is detected and sloped lines 52C to 52K respectively forming 45° angles with the CD lines 51C to 51K. When the image writing positions on the photosensitive drums 1C to 1K are correct and the transfer positions are also correct, this means that no color deviation occurs. In this case, middle points of the registration patterns 50C to 50K are located at the same position in the main scanning direction and come to a detection position of the optical sensor unit 25 as the transfer belt 10 moves in the transporting direction. Simultaneously, the CD lines 51C to 51K are formed with a distance D between them in the sub-scanning direction. The registration pattern is not limited to the V-shaped pattern, and various shapes can be applied. Hereinafter, for convenience of explanation, the detection position of the optical sensor unit 25 may be described as the "detection position line" as indicated by the dash lines in FIGS. 9A and 9B on the understanding that the transfer belt 10 is currently moving in the transporting direction. However, note that the optical sensor unit 25 does not laterally move along the dash line to detect the registration patterns 50C to 50K.

The operations of the image forming system 36 and the transporting system 37 are started by the main control unit 340 (step S303). Specifically, the main control unit 340 drives the photosensitive drums 1C to 1K and the transfer belt 10, and turns on other components provided in the image forming system 36 and the transporting system 37. Here, the grid voltage Vg, the bias voltage Vb, and the maximum exposure level are set by the main control unit 340 for each of the image forming units so that the corresponding developing potential difference ΔV shown in FIG. 4 is realized.

Next, the photosensitive drums 1C to 1K are respectively exposed at predetermined timings by the PH 35 via the PHC 330, so that electrostatic latent images of the registration patterns 50C to 50K are respectively formed on the photosensitive drums 1C to 1K using the image data set in step S302 (step S304). The electrostatic latent images of the registration patterns 50C to 50K are developed using the corresponding color toners and then transferred onto the transfer belt 10 (step S305).

Figure 10:
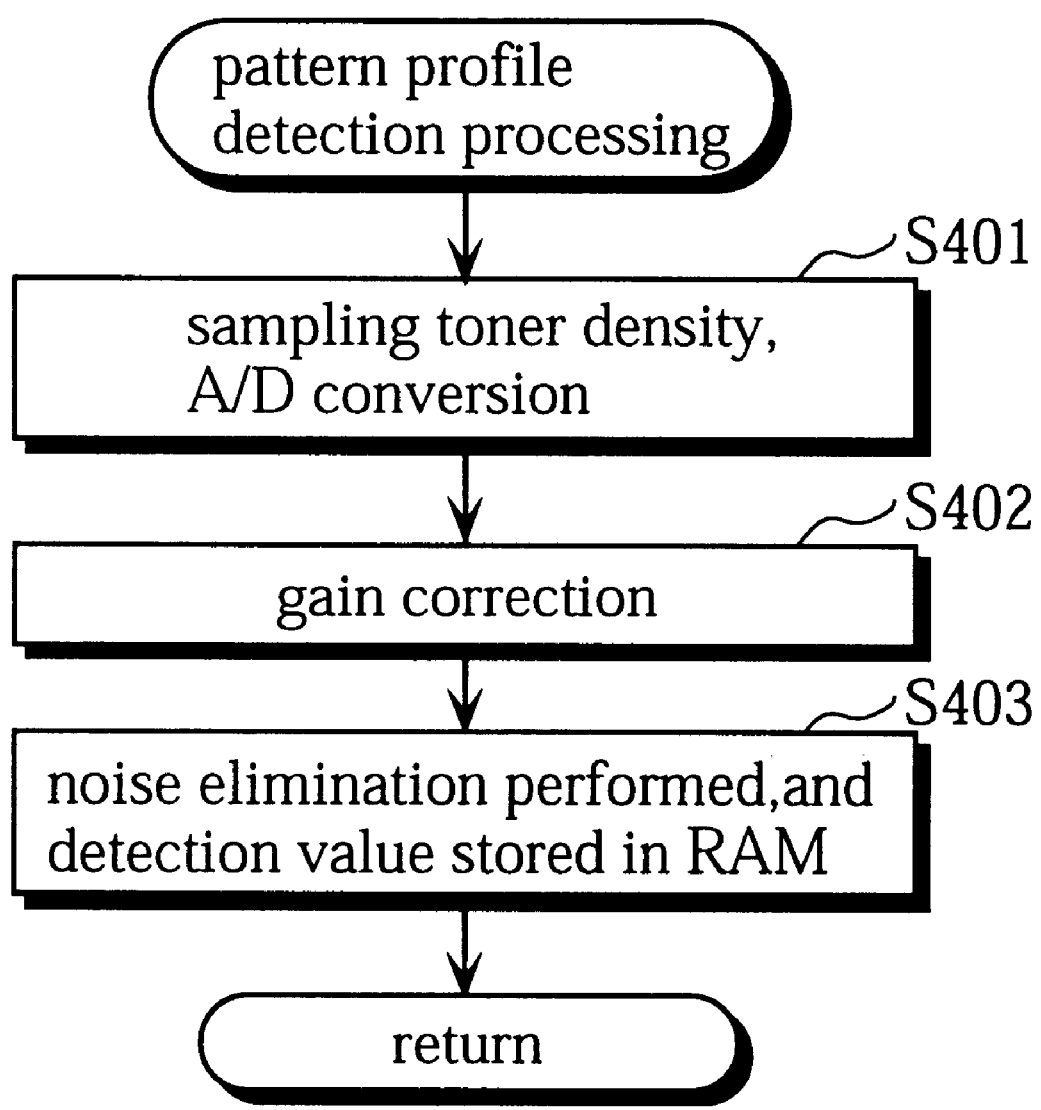
FIG. 10 is a flowchart of a control operation performed for pattern profile detection processing.

On completion of the registration pattern formation processing, pattern profile detection processing is next performed (step S104). FIG. 10 is a flowchart of the operation performed for the pattern profile detection processing. The optical sensor unit 25 samples the toner density on the surface of the transfer belt 10 at every predetermined time period, and the sampled density is converted into a digital value (step S401). The registration patterns 50C to 50K are formed on the transfer belt 10, with the middle points of them in the main scanning direction being located on the detection position line of the optical sensor unit 25 as shown in FIG. 9A. Thus, the density detected by the optical sensor unit 25 is changed every time one of the CD lines 51C to 51K or one of the sloped lines 52C to 52K passes between the PD and the LED of the optical sensor unit 25. In accordance with the detection result given by the optical sensor unit 25, each position of the CD lines 51C to 51K and the sloped lines 52C to 52K is obtained.

For the detection by the optical sensor unit 25, the registration detection control unit 350 changes the current LED-I applied to the LED of the optical sensor unit 25 corresponding to the colors of the registration patterns 50C to 50K as shown in FIG. 4. To obtain a proper timing in changing the current LED-I for each of the registration patterns 50C to 50K, the registration detection control unit 350 obtains each of time periods taken for the registration patterns 50C to 50K to reach the detection position of the optical sensor unit 25, from the corresponding transfer timing of the registration patterns 50C to 50K and the moving speed of the transfer belt 10. At the detection timing obtained from the time period for each of the registration patterns 50C to 50K, the registration detection control unit 350 changes the current LED-I. Alternatively, the registration detection control unit 350 may change the amount of light emitted from the LED whenever the value outputted from the optical sensor unit 25 has exceeded a predetermined value twice. This is because the registration detection control unit 350 considers the current color to have changed to another color whenever the outputted value has exceeded the predetermined value twice.

Then, each of the detection values of the registration patterns 50C to 50K is amplified, i.e., a gain correction is performed, using the corresponding amplification factor η shown in FIG. 4 (step S402). As a result, the values outputted by the optical sensor unit 25 on detecting the registration patterns 50C to 50K are approximately the same, and are appropriate. Next, noise elimination is performed on the detection values, and, after the noise elimination, the detection values are stored in the registration memory 350A (step S403).

In this way, the operation for sampling the density of the registration patterns 50C to 50K formed on the transfer belt 10 is terminated. After this operation, each barycenter of the sampling waveforms is obtained as the position of the corresponding CD line 51C to 51K or sloped line 52C to 52K (step S105).

Figure 1A:
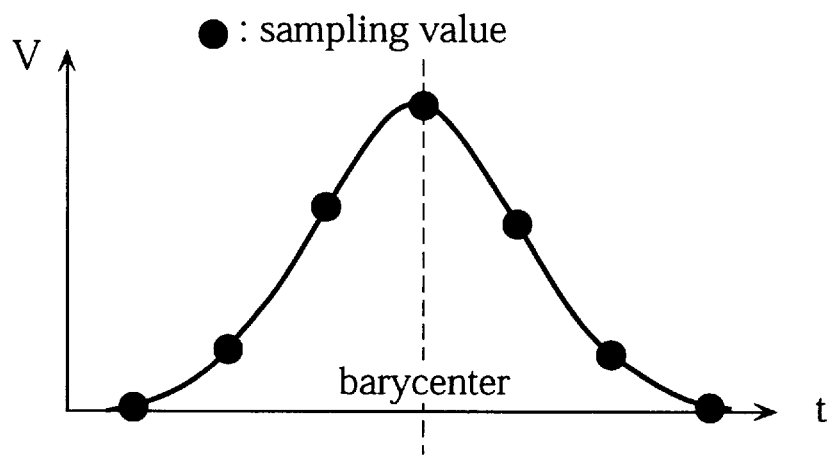
FIG. 1A shows an example of a sampling waveform of a registration pattern.
Figure 1B:
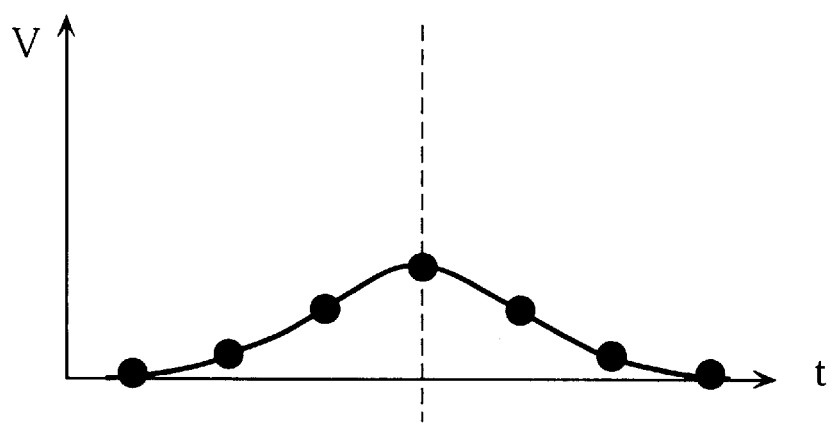
FIG. 1B shows an example of a sampling waveform of a registration pattern whose detection level is low.
Figure 1C:
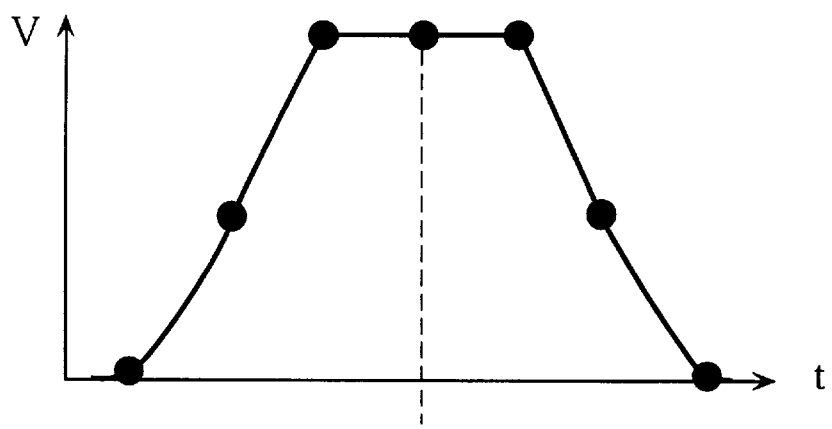
FIG. 1C shows an example of a sampling waveform of a registration pattern whose detection level is high.

The barycenter is determined as follows. A curve of a sampling waveform which has a peak is formed by interpolating sampling points whose values exceed the predetermined threshold level (see FIG. 1A). Part enclosed with the curve is integrated from both side ends. When areas of both sides are equal to one another, a border between the two areas is set as the barycenter. Here, each of the values outputted by the optical sensor unit 25 on detecting the registration patterns 50C to 50K has been set appropriate. As such, the reliable sampling waveform used for determining the barycenter is obtained for each of the CD lines 51C to 51K and sloped lines 52C to 52K of the registration patterns 50C to 50K. Accordingly, each barycenter can be properly determined.

In this way, each position of the CD lines 51C to 51K and sloped lines 52C to 52K of the registration patterns 50C to 50K is obtained. Next, a distance between a CD line and a corresponding sloped line of the registration patterns 50C to 50K and respective distances between the CD lines 51C to 51K are calculated as follows (step S106). The distance between a CD line and a corresponding sloped line is obtained by multiplying a time period taken from the detection of the CD line to the detection of the corresponding sloped line by the moving speed of the transfer belt 10. Similarly, each of the distances between the CD lines 51C to 51K is obtained by multiplying a time period taken from the detection of a CD line to the detection of the next CD line by the moving speed of the transfer belt 10.

Here, the position of the registration pattern 50K in the main scanning direction is set as a standard position, and the distance between the CD line 51K and the sloped line 52K obtained in step S106 is defined as a main scanning position standard value (step S107).

The following is a detailed description about the main scanning position standard value, with reference to FIG. 9B. FIG. 9B shows an enlarged view of the registration patterns 50K and 50Y formed on the transfer belt 10. A relative deviation between the registration patterns 50K and 50Y in the main scanning direction is obtained as follows. A distance from the detection position line of the optical sensor unit 25 (indicated in the dash line in FIG. 9B) to a point where the CD line 51K and the sloped line 52K intersect each other is referred to as a distance P*. A distance from the detection position line of the optical sensor unit 25 to a point where the CD line 51Y and the sloped line 52Y intersect each other is referred to as a distance Q*. In this case, the relative deviation between the registration patterns 50K and 50Y in the main scanning direction is obtained by calculating an expression (P*−Q*). Here, respective distances between the CD line and the sloped line of the registration patterns 50K and 50Y measured on the detection position line of the optical sensor unit 25 are referred to as distances P and Q. As stated above, the sloped lines 52K and 52Y respectively form 450 angles with the CD lines 51K and 51Y. As such, the distances P* and Q* are respectively equal to the distances P and Q. Therefore, the relative deviation of the registration patterns 50K and 50Y in the main scanning direction obtained by the expression (P*−Q*) is also obtained by an expression (P−Q).

Accordingly, relative deviations between the registration patterns 50C to 50K in the main scanning direction are obtained from differences in distance measured from the corresponding CD line 51C to 51K to the corresponding sloped line 52C to 52K on the detection position line. When the position of the registration pattern 50K is set as the standard position in the main scanning direction for the registration adjustment as described above, the main scanning position standard value can be used for calculating the deviation of the registration patterns 50C to 50Y in the main scanning direction.

The deviations of the registration patterns 50C to 50Y in the main scanning direction are accordingly calculated (step S108). As stated above, each of the deviations of the registration patterns 50C to 50Y relative to the registration pattern 50K is obtained by subtracting each distance between the CD line and the corresponding sloped line from the main scanning position standard value.

Each of the obtained deviations of the registration patterns 50C to 50Y relative to the registration pattern 50K in the main scanning direction is converted into the number of pixels to be shifted in the main scanning direction, and the number of pixels is then set as the amount of correction in the main scanning direction (step S109). Then, an address of the image data read from the image memory 320A is corrected for each pixel in accordance with the amount of correction, so that the image writing positions on the photosensitive drums 1C to 1K in the main scanning direction are adjusted (step S110).

Next, the image forming positions in the sub-scanning direction are adjusted. As in the case of the main scanning direction, the deviations of the registration patterns 50C to 50K in the sub-scanning direction are first obtained (step S111). When the image writing positions on the photosensitive drums 1C to 1K in the sub-scanning direction are correct, the CD lines 51C to 51K are formed with the distance D between them. However, when the image forming positions are incorrect, the distances between the CD lines 51C to 51K are not the distance D. As such, a difference between the distance D and a distance from a CD line to the next CD line is obtained as the deviation in the sub-scanning direction for each of the registration patterns 50C to 50K.

Each of the obtained deviations is converted into the number of pixels to be shifted in the sub-scanning direction, and the number of pixels is then set as the amount of correction in the sub-scanning direction (step S112). Then, an address of the image data read from the image memory 320A is corrected for each pixel in accordance with the amount of correction, so that the image writing positions on the photosensitive drums 1C to 1K in the sub-scanning direction are adjusted (step S113). Accordingly, the registration adjustment is terminated.

In the present embodiment, a sampling waveform having an appropriately high peak is obtained for each of the CD lines 51C to 51K and sloped lines 52C to 52K of the registration patterns 50C to 50K. By means of the sampling waveform, a proper barycenter, i.e., a position of a line in the corresponding registration pattern, can be determined. This enables the registration adjustment to be performed with high precision.

Second Embodiment

In the first embodiment, the values of the set parameters having effects on the values outputted by the optical sensor unit 25 on detecting the registration patterns 50C to 50K are fixed and stored in the registration memory 350A beforehand. However, in the second embodiment, the values of the set parameters are variables that are automatically set.

The copier used in the present embodiment is basically the same as the copier used in the first embodiment, except for the control programs. Operations performed using the control programs of the present embodiment include a set parameter adjustment control.

Figure 11:
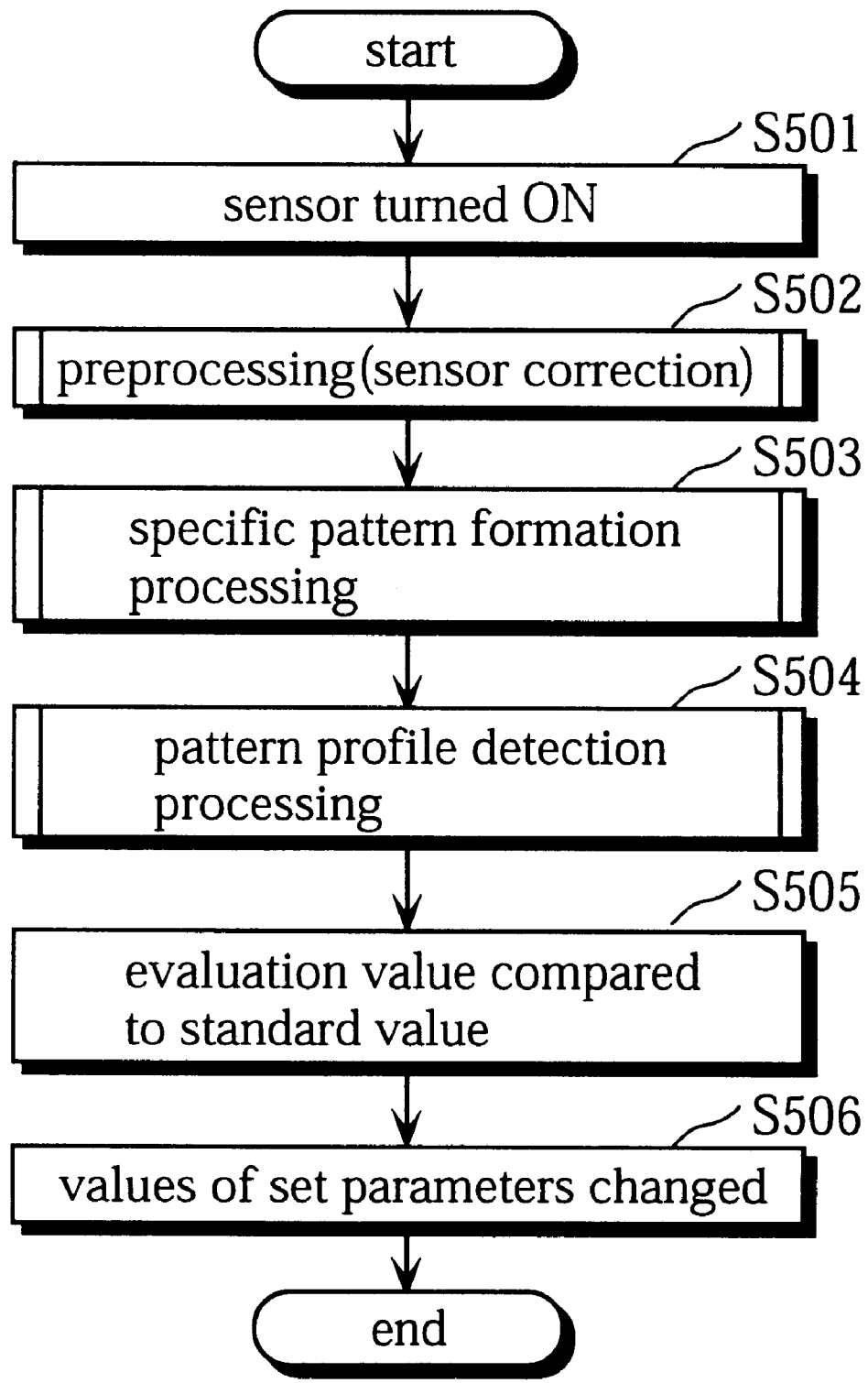
FIG. 11 is a flowchart of an operation performed for parameter adjustment control.

FIG. 11 is a flowchart of the operation performed for the set parameter adjustment control. This set parameter adjustment control can be periodically performed at a predetermined timing, such as when the copier is turned on and whenever a predetermined time period has elapsed, as long as the set parameter adjustment control is performed before the registration adjustment. As shown in FIG. 12A, initial values of a set parameter are set at the same value for each toner color before the set parameter adjustment control is performed.

For the set parameter adjustment control, the optical sensor unit 25 is first turned on (step S501). Then, preprocessing for correcting the setting of the optical sensor is performed (step S502). The operation performed for the preprocessing is the same as the operation shown by the flowchart of FIG. 7.

Figure 13:
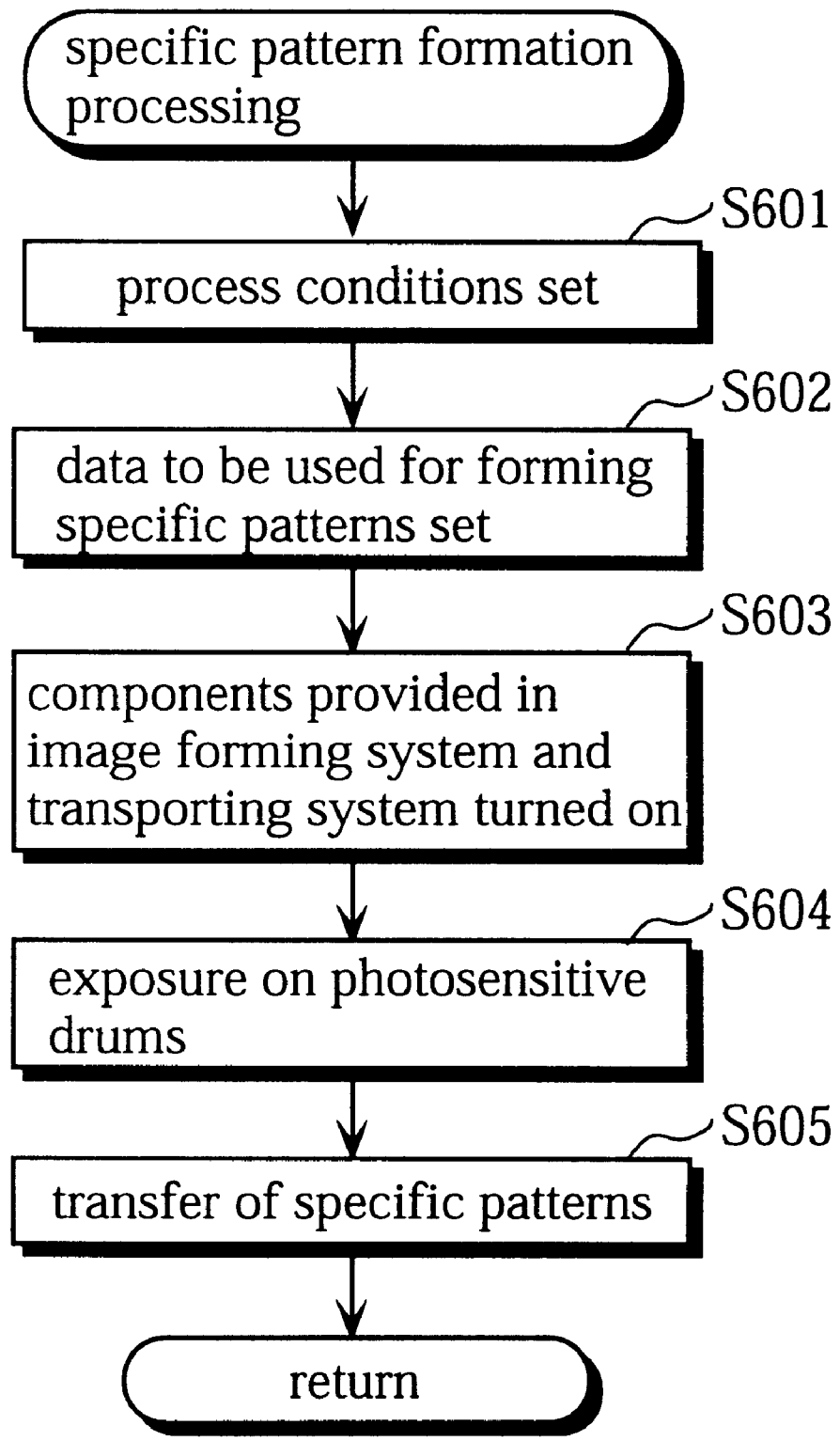
FIG. 13 is a flowchart of an operation performed for specific pattern formation processing.
Figure 14A:
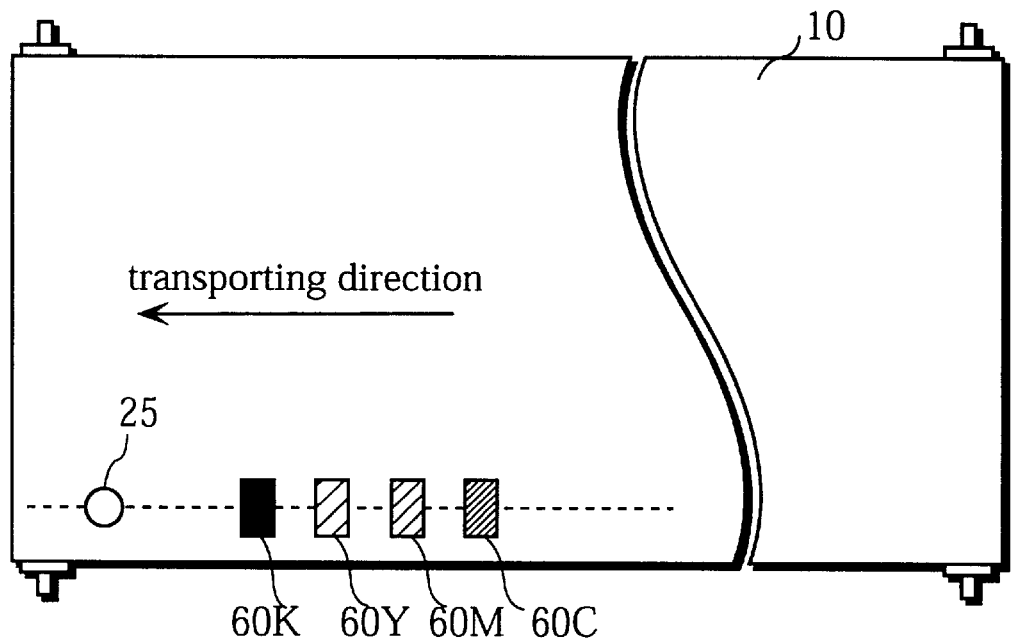
FIG. 14A shows a specific pattern example.

Next, specific pattern formation processing is performed (step S503). FIG. 13 is a flowchart of the operation performed for the specific pattern formation processing. This specific pattern formation processing is basically the same as the registration pattern formation processing shown by the flowchart of FIG. 8. The specific pattern formation processing differs from the registration pattern formation processing that the grid voltage Vg, the bias voltage Vb, and the maximum exposure level are set for each toner color on setting the process conditions so that the developing potential differences $\Delta V$ are the same for each toner color as shown in FIG. 12A (step S601). Another difference is that patterns formed in the specific pattern formation processing is specific patterns 60C to 60K as shown in FIG. 14A (step S602).

Figure 14B:
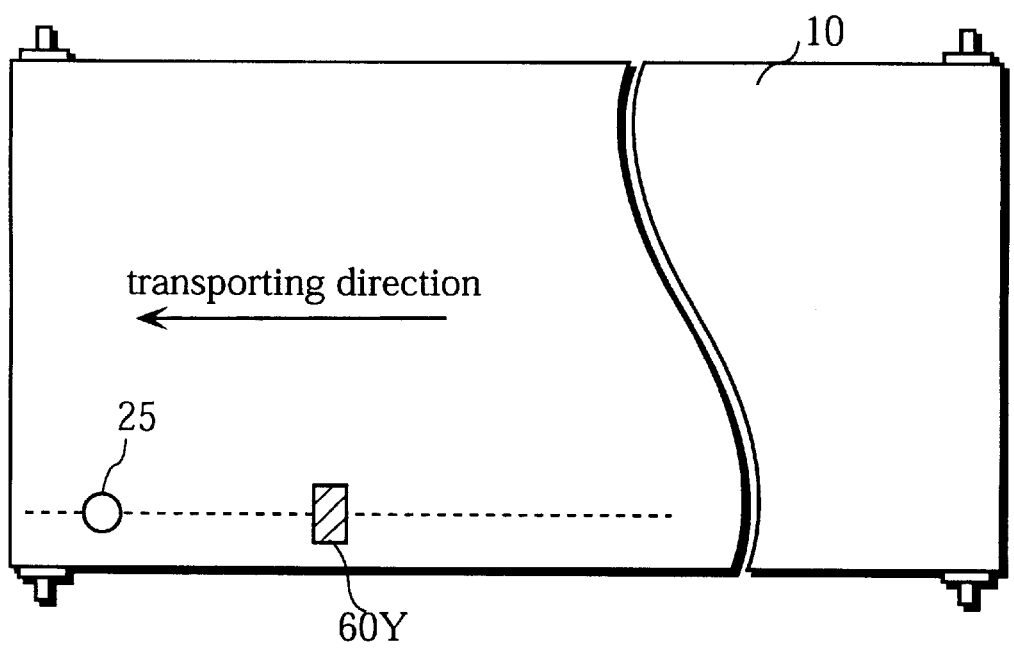
FIG. 14B shows a specific pattern example.

As in the case of the registration patterns 50C to 50K, data for writing the specific pattern is stored in the image memory 320A beforehand. The shape of the specific pattern is not limited to the shape shown in FIG. 14A, and the V-shaped registration patterns can be used as the specific patterns. In the present embodiment, the specific pattern is formed in each toner color. However, the specific pattern may be formed only for at least one color whose set parameters need to be changed in particular. For example, only the specific pattern 60Y may be formed as shown in FIG. 14B since the transmittance of yellow toner is the highest. As another example, when the reflection type sensor is used for the optical sensor unit 25, only the specific pattern 60K may be formed due to its lowest reflectivity. Or, the specific patterns may be formed only for yellow and black.

By means of the exposure, electrostatic latent images of the specific patterns 60C to 60K are respectively formed on the photosensitive drums 1C to 1K (step S604). The electrostatic latent images are then developed into toner images, which are then sequentially transferred onto the transfer belt 10 (step S605).

Figure 15:
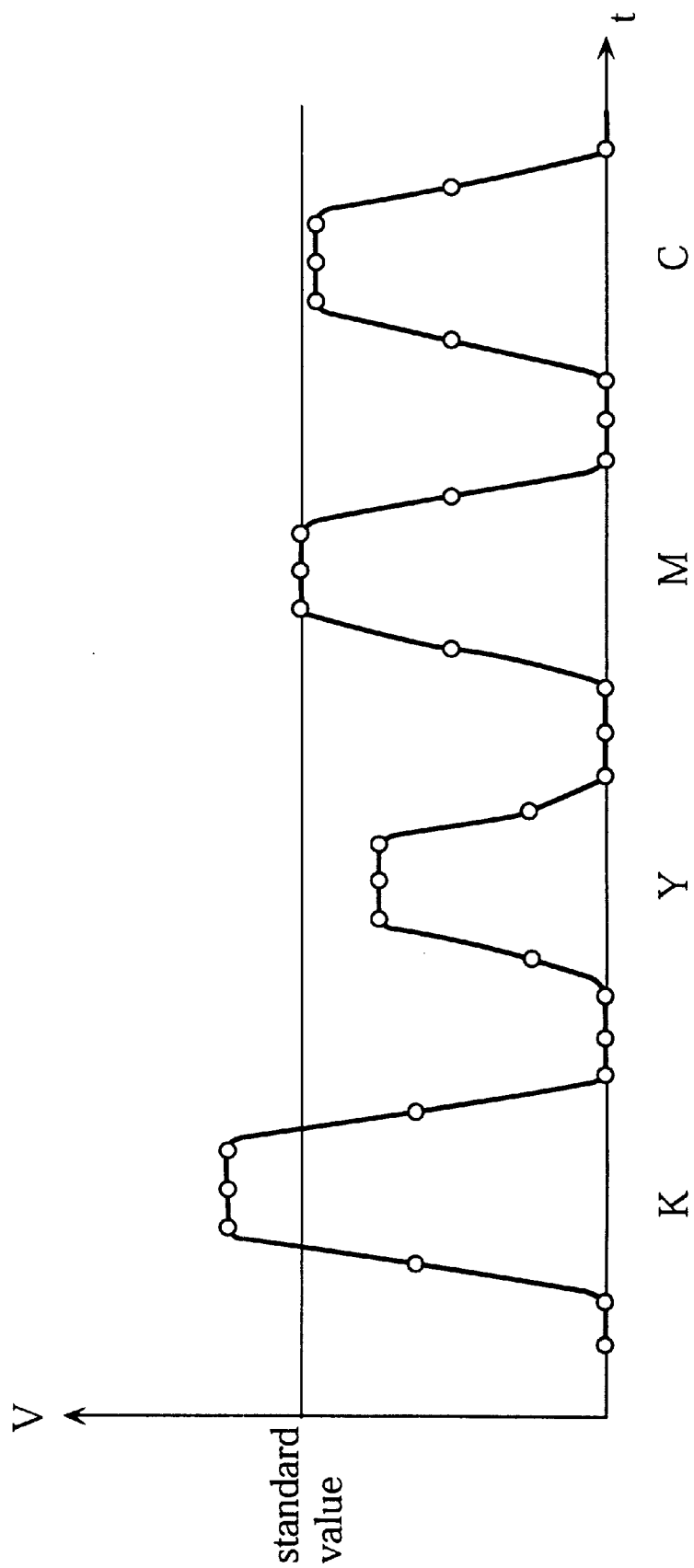
FIG. 15 shows an example of a sampling waveform of a specific patterns.

After the transfer of the specific patterns 60C to 60K, pattern profile detection processing is next performed (step S504). This pattern profile detection processing is basically the same as the processing shown by the flowchart of FIG. 10. For the pattern profile detection processing of the present embodiment, the currents LED-I to be applied to the LED of the optical sensor unit 25 are set at the same value for each toner color, and therefore, the current LED-I does not need to be changed corresponding to the toner colors. Similarly, the amplification factors $\eta$ are also set at the same value for each toner color, and the outputted values given by the PD of the optical sensor unit 25 are amplified for each toner color using the same amplification factor $\eta$. Then, the sampling waveform shown in FIG. 15 as one example is obtained.

On completion of the pattern profile detection processing for the toner density sampling of the specific patterns 60C to 60K, each of the values outputted by the optical sensor unit 25 on detecting the specific patterns 60C to 60K is compared to a standard value (step S505). The standard value is an experimentally obtained value, which is outputted by the optical sensor unit 25 when a proper sampling waveform is obtained under the set values shown in FIG. 12A. For a comparing process in step S505, each wave in the sampling waveform is identified as that of the corresponding specific pattern 60C to 60K by a sampling timing or a change in the sampling waveform. Then, a mean value of sampling values exceeding a predetermined value in a wave or the greatest value in a wave is set as an evaluation value of the corresponding specific pattern. The evaluation value is then compared to the standard value to obtain a ratio between them.

In accordance with the ratio obtained for each of the specific patterns 60C to 60K, the values of the set parameters shown in FIG. 12A are changed for each toner color (step S506). As one example, suppose that a ratio X is obtained from a comparison between an evaluation value and the standard value. The current LED-I applied to the LED is obtained by multiplying the initial value (20 mA in FIG. 12A) by the ratio X. The developing potential difference $\Delta V$ is obtained by dividing the initial value (400 V in FIG. 12A) by the ratio X. The amplification factor η is also obtained by dividing the initial value (1.0 in FIG. 12A) by the ratio X. Here, when the ratios X for the specific patterns 60C to 60K are respectively obtained as 1.0, 1.0, 0.75, and 1.25 from the sampling waveform shown in FIG. 15, the values of the set parameters are changed for each toner color as shown in FIG. 12B.

It should be obvious that the method to set the values of the set parameters is not limited to this, and various methods can be applied. As one example, the values may be set for each toner color in accordance with a difference between the evaluation value and the standard value.

By means of the set parameter adjustment control, the values of a set parameter having an effect on the values outputted by the optical sensor unit 25 are appropriately set corresponding to the toner colors. Under the set values, the registration adjustment described in the first embodiment is performed. A proper sampling waveform can be obtained for each of the CD lines 51C to 51K and sloped lines 52C to 52K of the registration patterns 50C to 50K, as in the case of the first embodiment. Thus, a proper barycenter, i.e., a position of a line in the corresponding registration pattern, can be determined. This enables the registration adjustment to be performed with high precision.

Using the method described in the second embodiment, the values of the set parameters are set according to the circumstances. Therefore, even when the sensitivity of the optical sensor unit 25 decreases, for example, the sampling waveform can be reliably obtained.

In the stated embodiments, as one example of the adjustment in the image forming condition, the image forming positions are adjusted through the detection of the registration patterns to reduce the color deviations. The scope of application of the present invention is not limited to the deviation adjustment. The present invention can be applied to various cases for making an adjustment in the image forming condition as long as a plurality of toner patterns formed in different colors are detected by a single detector.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image forming apparatus which forms a color image by superimposing images formed in a plurality of colors according to an image forming condition, the image forming apparatus comprising:

a pattern former which forms a pattern in each of the plurality of colors on a transfer medium;

a detector which detects the pattern formed in each color on the transfer medium and outputs a detection result for each color in accordance with a predetermined parameter, the predetermined parameter effecting the detection result outputted by the detector; and an image forming condition controller which sets a value of the predetermined parameter for each color so that the detection result outputted by the detector for each pattern formed in each color is equivalent, the value set for at least on of the colors being different to the values set for other colors.

2. The image forming apparatus of claim 1 further comprising a memory which stores the value of the predetermined parameter for each color beforehand.

3. The image forming apparatus of claim 1, wherein at least one of a density of the pattern formed by the pattern former and an amplification factor for an output of the detector is set as the predetermined parameter.

4. The image forming apparatus of claim 1, wherein the detector is a sensor which has a light emitter and a photoreceptor.

5. The image forming apparatus of claim 4, wherein at least one of a density of the pattern formed by the pattern former, an amount of light emitted from the light emitter, and an amplification factor used for an output of the photoreceptor is set as the predetermined parameter.

6. The image forming apparatus of claim 1, wherein the value of the predetermined parameter for a color whose detection output is lowest is set so as to increase the detection result for the color.

7. The image forming apparatus of claim 1, wherein the image forming condition controller includes:

a pattern forming position obtaining portion which obtains a forming position of the pattern for a color from the detection result outputted by the detector; and an image forming position adjusting portion which adjusts an image forming position for the color to reduce the deviation in accordance with the forming position obtained by the pattern forming position obtaining portion.

8. The image forming apparatus of claim 1, wherein the value of the parameter is changeable by the image forming condition controller.

9. The image forming apparatus of claim 8, wherein the image forming condition controller changes the value of the parameter for a specific color.

10. The image forming apparatus of claim 8, wherein the image forming condition controller changes the value of the parameter in accordance with a detection result outputted by the detector.

11. The image forming apparatus of claim 8, wherein the image forming condition controller adjusts the value of the parameter for a color whose detection output is lowest so as to increase the detection result for the color.

12. An image forming position adjusting method for an image forming apparatus which forms a color image by superimposing images formed in a plurality of colors, the image forming position adjusting method comprising:

a pattern forming step of forming a pattern in each of the plurality of colors on a transfer medium;

a position detecting step of detecting a position of the pattern and outputting a detection result;

a parameter value setting step of setting a value of a parameter having an effect on the detection result outputted in the detecting step for each color so that the outputted detection result for each pattern formed in each color is equivalent, the value set for a color being different to the values set for other colors; and an adjusting step of adjusting an image forming position in accordance with the detection result, wherein the parameter value setting step is capable of being performed in advance of the position detecting step, and wherein the parameter value setting step is capable of being performed in advance of the pattern forming step.

13. The image forming position adjusting method of claim 12 further including
a pattern detecting step of detecting the pattern formed on the transfer medium for a parameter value setting.

14. The image forming position adjusting method of claim 12,
wherein a parameter stored in a memory beforehand is used in the parameter value setting step.

15. The image forming position adjusting method of claim 14,
wherein one of a density of the pattern, an amount of light emitted from a light emitter, and an amplification factor used for an output of a photoreceptor is set as the parameter stored in the memory.

16. The image forming position adjusting method of claim 12,
wherein, in the parameter value setting step, the value of the parameter for a color whose detection output is lowest is set so as to increase the detection result outputted for the color.

17. An image formation condition adjusting method for an image forming apparatus which forms a color image by superimposing images formed in a plurality of colors according to an image forming condition, the image formation condition adjusting method comprising:
a detecting step of detecting a pattern formed in each of the plurality of colors on a transfer medium and of outputting a detection result for each color in accordance with a predetermined parameter;
a parameter value setting step of setting a value of the predetermined parameter for each color so that the detection result outputted for each pattern formed in each color is equivalent, the value set for at least one color being different to the values set for other colors; and
an adjusting step of adjusting an image forming condition in accordance with the detection result outputted in the detection step.

18. The image formation condition adjusting method of claim 17,
wherein a position of the pattern is detected in the detecting step, and
wherein a position of an image to be formed is adjusted in the adjusting step in accordance with the detection result outputted in the detecting step.

* * * * *